United States Patent [19]
Taska

[11] 3,919,786
[45] Nov. 18, 1975

[54] SEGMENTED INCLINED PLANE FOR USE IN TEACHING CHILDREN THE CONCEPT OF DIRECTIONALITY

[76] Inventor: Eileen R. Taska, 14 Wildflower Trail, Greenwich, Conn. 06830

[22] Filed: May 3, 1974

[21] Appl. No.: 466,523

[52] U.S. Cl. .......................... 35/35 J; 35/72; 46/24
[51] Int. Cl.² .................. G09B 17/00; A63H 33/06
[58] Field of Search........... 35/35 R, 35 H, 35 J, 36, 35/37, 69–73, 27, 28, 30, 31 R, 31 D, 31 G, 31 F, 32, 34; 46/16, 23–26

[56] References Cited
UNITED STATES PATENTS

| | | | |
|---|---|---|---|
| 3,229,388 | 1/1966 | Smith | 35/70 |
| 3,672,074 | 6/1972 | Huffstetter | 35/35 H |
| 3,774,318 | 11/1973 | Sterriti | 35/35 R |
| 3,851,409 | 12/1974 | Teahan | 35/31 F |

FOREIGN PATENTS OR APPLICATIONS

| | | | |
|---|---|---|---|
| 193,377 | 2/1938 | Switzerland | 46/24 |
| 321,251 | 5/1902 | France | 35/31 D |

Primary Examiner—Wm. H. Grieb

[57] ABSTRACT

A teaching aid is provided which is particularly useful in the teaching of children suffering from learning disabilities of the type which are evidenced by the fact that the child can not read because of left to right sequencing problems and has an aversion to graphical representation. The subject teaching aid includes a multiplicity of block-like members which when arranged in end-to-end relation are operable to form a segmented inclined plane. Each of the block-like members is of substantially the same width and length but is of differing height. More particularly, the top wall of each of the block-like members is sloped so that the height of the block-like member measured at the corner formed by the intersection of one edge of the top wall and one of the end walls of the block-like member is less than the height of the same block-like member measured at the corner formed by the intersection of the other edge of the top wall and the other end wall thereof. The angle of inclination of the top wall is the same for all of the multiplicity of block-like members so that a surface having a continuous slope is produced when the multiplicity of block-like members are arranged with their end walls in abutting relation in order of increased height. The teaching aid also includes a reading script which is designed to be utilized with the multiplicity of block-like members. More particularly, with the multiplicity of block-like members in disarray before the child, the latter is told a story in which he is directed to arrange the multiplicity of block-like members in a predetermined manner. Thus, by utilizing these multiplicity of block-like members, the child is taught to arrange them in ascending or descending order, and therethrough the concept of left to right sequencing.

4 Claims, 3 Drawing Figures

SEGMENTED INCLINED PLANE FOR USE IN TEACHING CHILDREN THE CONCEPT OF DIRECTIONALITY

BACKGROUND OF THE INVENTION

As evidenced by reference to the prior art, it has long been known to provide teaching aids for use by a teacher in instructing her students. Such teaching aids have been of various types. However, irrespective of the particular form of construction which the teaching aids may embody or the manner in which they are intended to be used, the objective in employing such teaching aids nevertheless remains the same. Namely, the teaching aids are intended to be utilized as a means of assisting the teacher in better performing the task of teaching her students.

Although significant results have been achieved by employing some of the prior art forms of teaching aids, such aids have generally been designed to be used by a teacher instructing a class of so-called normal students, i.e., children without learning disabilities. More particularly, very little attention has been paid in the past to developing teaching aids which are particularly suited for use in the teaching of children who suffer from learning disabilities. Moreover, it has been found that even the prior art forms of teaching aids which have proven effective when employed for purposes of assisting in the instruction of children who do not have learning disabilities are largely ineffective when attempts are made to utilize them in the same manner with children who do suffer from learning disabilities.

There has thus existed a need to provide teaching aids which are specifically designed to meet the needs of those teachers who work with children having learning disabilities. The difficulty encountered in attempting to teach such children stems primarily from the fact that conventional teaching methods are not effective with such children. Generally speaking, this is because these children do not have the basic skills commonly possessed by children of their same age group. Another difficulty resides in the fact that different children possess different types of learning disabilities. Although difficulty is sometimes encountered in determining the nature of the learning disability from which a child suffers, the most difficult problem which must be overcome is that of devising a teaching process which will be effective, when employed, to teach the child. Concomitant with this is determining the level of foundation that the child has for learning.

For example, a need was found to exist to provide some form of training aid which would be effective when employed by a teacher for purposes of teaching a child who suffered from a left to right sequencing problem. This is perhaps best exemplified by reference to the case of one particular child who at the age of eight could not read because of left to right sequencing problems. The child could identify the letters of the alphabet. However, when it came to reading a word he would arbitrarily begin anywhere within the word and sound out the letters in whatever sequence he chose. This was obviously the reason for his aversion to any graphic representation. The so-called normal child, i.e., child without learning disabilities, of the same age on the other hand has long since mastered the concepts of directionality, which include among them left to right sequencing. Therefore, notwithstanding the fact that a number of different types of teaching aids existed in the prior art, it was found that a need still remained to provide a teaching aid which would be effective when used with children having left to right sequencing problems which prevented them from learning to read.

Accordingly, it is an object of the present invention to provide a segmented inclined plane which is capable of being utilized as a teaching aid by a teacher in instructing her students.

It is another object of the present invention to provide such a segmented inclined plane which is particularly suited to be used as a teaching aid to assist in teaching children with learning disabilities.

A still further object of the present invention is to provide such a segmented inclined plane which is particularly useful as a teaching aid in assisting a teacher to teach children who because of learning disabilities have been unable to learn to read.

Still another object of the present invention is to provide such a segmented inclined plane which is capable of being used as a teaching aid by teachers in instructing children who have learning disabilities which are evidenced by the fact that the children have left to right sequencing problems.

Yet an object of the present invention is to provide such a segmented inclined plane which has proven capable of providing very effective results when employed by a teacher to teach a child having learning disabilities which include an aversion to graphic representation to overcome left to right sequencing problems.

Yet another object of the present invention is to provide such a segmented inclined plane employable as a teaching aid for children with learning disabilities which is relatively inexpensive to manufacture, is easy to employ, and is characterized by a relatively long operating life.

SUMMARY OF THE INVENTION

It has now been found that the foregoing and related objects can be readily attained in a segmented inclined plane which is particularly useful as a teaching aid in the teaching of children suffering from learning disabilities of the type which are evidenced by the fact that the child has been unable to learn to read because of left to right sequencing problems and an aversion to graphic representation. The segmented inclined plane consists of a multiplicity of block-like members. Each of the multiplicity of block-like members is of differing height relative to each other. In addition, the top wall of each of the multiplicity of block-like members slopes so that the block-like members themselves each also vary in height from one end wall to the other end wall thereof. The angle of inclination of the top wall is the same for all of the multiplicity of block-like members so that a surface having a continuous slope is produced when the multiplicity of block-like members is arranged with their end walls in abutting relation in order of increasing height. A reading script is also provided which is designed to be utilized in conjunction with the segmented inclined plane. More particularly, with the multiplicity of block-like members in disarray before the child, the latter is told a story in which he is instructed to arrange the multiplicity of block-like members in a predetermined manner. Thus, utilizing these multiplicity of block-like members, the child is taught to arrange them in ascending or descending order to form a segmented inclined plane, and therethrough the concept of sequencing.

In accord with the preferred embodiment of the invention, the segmented inclined plane is composed of ten block-like members. Each of these ten block-like members is of substantially the same length and width but differ one from another in height as mentioned previously. Preferably, each of the ten block-like members is made of wood so as to provide a durable yet easily grasped member. Each of the block-like members is defined by a bottom wall, a pair of equal side walls, and a sloping top wall. By virtue of the slope of the top wall, the height of the block-like member measured at the corner formed by the intersection of one edge of the top wall and one of the end walls of the block-like member is less than the height of the same block-like member measured at the corner formed by the intersection of the other edge of the top wall and the other end wall thereof. Furthermore, in this regard the height of at least one of the end walls of each of the ten block-like members is substantially equal to the height of at least one end wall of one of the other remaining block-like members. The reading script which is employed in conjunction with the segmented inclined plane contains a first story which is designed to be told to the child when it is desired to have the latter arrange the ten block-like members in order of ascending height, and a second story which is used when it is desired to have the child arrange the ten block-like members in order of descending height.

DETAILED DESCRIPTION OF THE ILLUSTRATED EMBODIMENTS

Figure 1:
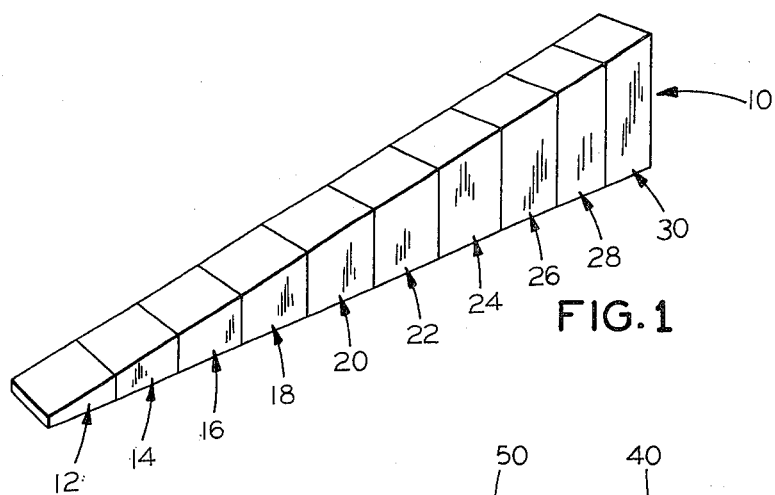
FIG. 1 is a perspective view of a segmented inclined plane included in a teaching kit constructed in accordance with the present invention.

Referring now to the drawings, and more particularly FIG. 1 thereof, there is depicted therein a segmented inclined plane, generally designated by reference numeral 10. The plane 10 along with a reading script (not shown) which is designed to be employed in conjunction therewith comprises a teaching kit constructed in accordance with the present invention which is particularly suited for use in teaching children having learning disabilities and an aversion to graphic representation to overcome sequencing problems which have inhibited the child's ability to learn to read. The segmented inclined plane 10 consists of ten block-like members designated by the reference numerals 12, 14, 16, 18, 20, 22, 24, 26, 28 and 30, respectively. All of the block-like members, i.e., segments 12, 14, 16, 18, 20, 22, 24, 26, 28 and 30 are preferably made of wood. However, it is to be understood that other types of materials such as plastic, etc., could be employed to form the segments 12, 14, 16, 18, 20, 22, 24, 26, 28 and 30 without departing from the essence of the invention.

Figure 2:
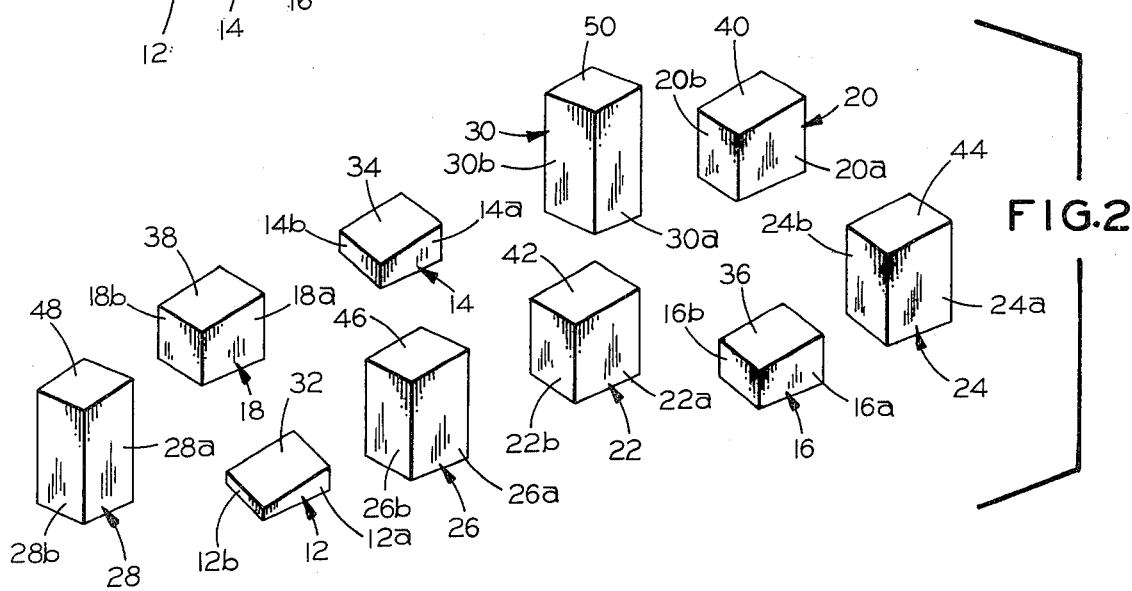
FIG. 2 is an exploded perspective view of a segmented inclined plane included in a teaching kit constructed in accordance with the present invention, illustrating the multiplicity of block-like members which comprise the segmented inclined plane in disarray.

Turning now to a detailed description of the construction of the segments 12, 14, 16, 18, 20, 22, 24, 26, 28 and 30, reference will be had for this purpose particularly to FIG. 2 of the drawings. As best understood with reference to FIG. 2 of the drawings, each of the block-like members, i.e., segments 12, 14, 16, 18, 20, 22, 24, 26, 28 and 30 includes a pair of side walls only one of which is visible in the drawings, namely, side walls 12a, 14a, 16a, 18a, 20a, 22a, 24a, 26a, 28a and 30a, respectively, and a pair of end walls only one of which is visible in the drawings, namely, end walls 12b, 14b, 16b, 18b, 20b, 22b, 24b, 26b, 28b, 30b, respectively. Preferably the length of the side walls 12a, 14a, 16a, 18a, 20a, 22a, 24a, 26a, 28a and 30a and the width of the end walls 12b, 14b, 16b, 18b, 20b, 22b, 24b, 26b, 28b and 30b of all of the segments 12, 14, 16, 18, 20, 22, 24, 26, 28 and 30 are substantially the same so that the segments 12, 14, 16, 18, 20, 22, 24, 26, 28 and 30 all have lengths which are substantially equal and widths which are substantially equal. Each of the segments 12, 14, 16, 18, 20, 22, 24, 26, 28 and 30 also includes a bottom wall not visible in the drawings and a top wall 32, 34, 36, 38, 40, 42, 44, 46, 48, 50, respectively, located in opposed relation to the corresponding bottom wall. As shown in FIGS. 1 and 2 of the drawings, the top walls 32, 34, 36, 38, 40, 42, 44, 46, 48 and 50 of the segments 12, 14, 16, 18, 20, 22, 24, 26, 28 and 30, respectively, are each sloped. Consequently, one of the end walls of each of the segments 12, 14, 16, 18, 20, 22, 24, 26, 28 and 30 has a lesser height than does the other one of the end walls thereof. More specifically, utilizing the segment 12a by way of illustration, it can be seen with reference to FIGS. 1 and 2 of the drawings that the height of the block-like member, i.e., segment 12 measured at the corner formed by the intersection of one edge of the top wall 32 and the end wall 12b is less than the height of the segment 12 measured at the corner formed by the intersection of the other edge of the top wall 32 and the other end wall which is not visible in the drawings. Moreover, it will be noted that the height of at least one of the end walls of each of the ten segments 12, 14, 16, 18, 20, 22, 24, 26, 28 and 30 is substantially equal to the height of at least one end wall of one of the other remaining segments. The angle of inclination of the corresponding top wall 32, 34, 36, 38, 40, 42, 44, 46, 48 and 50, respectively, is the same for all ten of the segments 12, 14, 16, 18, 20, 22, 24, 26, 28 and 30 so that a surface having a continuous slope is produced when the multiplicity of segments 12, 14, 16, 18, 20, 22, 24, 26, 28 and 30 is arranged with their end walls in abutting relation in order of increased height in the manner illustrated in FIG. 1 of the drawings.

Turning now to a description of the preferred method of utilizing the segmented inclined plane 10, the latter is presented to the child as a pile of blocks which are in disarray, i.e., placed relative to each other in the same manner as shown in FIG. 2 of the drawings or in a manner similar thereto. The segments 12, 14, 16, 18, 20, 22, 24, 26, 28 and 30 are then to be assembled by the child in a sequence which is a three dimensional representation of an accompanying story which forms part of a reading script (not shown) which in turn with the segmented inclined plane 10 comprise the teaching kit of the present invention. For example, the story may relate the situation wherein the child is located on top of a mountain on his skiis and is going to ski down a long slope to the bottom thereof. The child is therefore told to assemble the segments 12, 14, 16, 18, 20, 22, 24, 26, 28 and 30 so as to construct the long slope described in the story. Accordingly, in this instance beginning with the segment identified by reference numeral 30 in FIGS. 1 and 2 of the drawings, i.e., the highest segment, the child would position the latter on the left. Next to the segment 30 he would place the next highest segment and so on in sequence on down to the lowest segment, i.e., the segment identified by reference numeral 12, which is positioned at the extreme right of the line of segments. This procedure is repeated with the child until he correctly learns the concept of directionality as applied to the arranging of objects in descending order.

The segmented inclined plane 10 is capable also of being utilized to teach a child the concept of directionality as it applies to arranging objects in order of ascending height. To this end, the reading script (not shown) includes another story which is designed to be used for this purpose. For example, the latter story may set forth the situation wherein the child is just about to start climbing a long gradual hill. The child thus is told to form a three-dimensional representation of the story, i.e., to create a hill having a long gradual slope using the segments 12, 14, 16, 18, 20, 22, 24, 26, 28 and 30. Consequently, the child in this case would begin by positioning on the left the lowest segment, i.e., the segment designated by reference numeral 12 in FIGS. 1 and 2 of the drawings. Next to the segment 12 he would place the next higher segment, i.e., the segment 14, and so on until on the far right the highest segment, i.e., the segment 30 would be located. This procedure would be repeated until the child evidences the fact that he has learned the concept of directionality insofar as it applies to objects arranged in ascending order.

Figure 3:
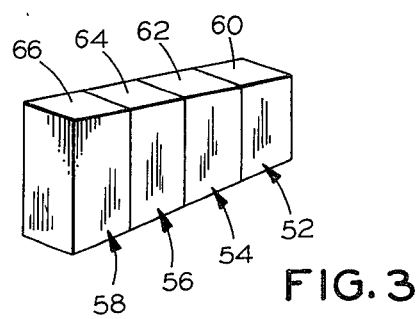
FIG. 3 is a perspective view of another embodiment of a segmented plane included in a teaching kit constructed in accordance with the present invention.

Referring next to FIG. 3 of the drawings, there is illustrated therein four segments 52, 54, 56 and 58 which when arranged with their end walls in abutting relation as shown in FIG. 3 comprise a shortened version of the segmented inclined plane 10 described hereinabove and illustrated in FIGS. 1 and 2 of the drawings. More specifically, the four segments 52, 54, 56, and 58 form another embodiment of a segmented inclined plane which together with a reading script (not shown) designed to be used in conjunction therewith constitute another embodiment of a teaching kit constructed in accordance with the present invention. Each of the segments 52, 54, 56 and 58 embody a construction which is similar to that of the segments 12, 14, 16, 18, 20, 22, 24, 26, 28 and 30 of segmented inclined plane 10 previously described herein. Namely, each of the segments 52, 54, 56 and 58 is defined by a bottom wall which is not visible in the drawings, a pair of equal side walls only one of which is visible in the drawings, a pair of unequal end walls of which only one of the end walls of the segment 58 is visible in the drawings, and a top wall 60, 62, 64 and 66, respectively. Preferably, the length of the side walls and the width of the end walls of all of the segments 52, 54, 56 and 58 are substantially the same so that segments 52, 54, 56 and 58 all have lengths which are substantially equal and widths which are substantially equal. As illustrated in FIG. 3 of the drawings, the top walls 60, 62, 64 and 66 of the segments 52, 54, 56 and 58, respectively, are each sloped. Consequently, one of the end walls of each of the segments 52, 54, 56 and 58 has a lesser height than does the other one of the end walls thereof. Thus, it can be seen that in addition to each of the segments 52, 54, 56 and 58 being of different heights relative to each other, the segments 52, 54, 56 and 58 themselves each vary in height along the length thereof. Also, it will be noted that at least one of the end walls of each of the four segments 52, 54, 56 and 58 is substantially equal in height to at least one of the end walls of one of the other remaining segments. The angle of inclination of the corresponding top wall 60, 62, 64 and 66, respectively, is the same for all four of the segments 52, 54, 56 and 58 so that a surface having a continuous slope is produced when the multiplicity of segments 52, 54, 56 and 58 is arranged with their end walls in abutting relation in order of descending height in the manner illustrated in FIG. 3 of the drawings.

Inasmuch as the four segments 52, 54, 56 and 58 are designed to be utilized in the same manner as was described previously herein for the segmented inclined plane 10, it is not deemed necessary therefore to set forth in detail the method of employing the shortened version of the segmented inclined plane 10. Suffice it to say that the four segments 52, 54, 56 and 58 are presented to the child in disarray. The segments 52, 54, 56 and 58 are to be assembled in a sequence which is a three dimensional representation of an accompanying story. The latter story may comprise either of the two stories which are found in the reading script which is provided for use in conjunction with the segmented inclined plane. Depending on which story is being used, the child will assemble the four segments 52, 54, 56 and 58 to form a three-dimensional representation of the particular story, either in order of ascending height or in order of descending height, the latter being the manner in which the segments 52, 54, 56 and 58 are assembled in FIG. 3 of the drawings. The object in either case is to teach the child the concepts of directionality. To do so, may require the child to repeat the assembling of the segments 52, 54, 56 and 58 a number of times. The shortened version of the segmented inclined plane depicted in FIG. 3 has been found to be particularly suited for use when beginning the teaching process with a child. More particularly, it has been found that when first beginning with a child fewer segments should be used to lessen the number of necessary discriminations and enhance the probability of success. As the child is successful, the number of segments can be gradually increased.

Although two embodiments of a segmented inclined plane which in combination with a reading script comprise the teaching kit of the present invention have been described hereinabove and illustrated in the drawings, it is nevertheless to be understood that other modifications in the construction thereof may be made thereto by those skilled in the art without departing from the essence of the invention. In this connection, some of the modifications which can be made in the teaching kit of the present invention have been alluded to hereinabove while others will become readily apparent to those skilled in the art when exposed to the present description and illustration of the construction of the two embodiments of segmented inclined planes. For example, it has been set forth above that the segments which comprise the segmented inclined planes can be made of materials other than wood without departing from the essence of the invention. Also, the relative size of the individual segments can be varied without departing from the essence of the invention as long as all of the segments which together comprise one of the segmented inclined planes are all increased or decreased in size by the same proportion. Moreover, it should be readily apparent that a greater or a lesser number of segments can be utilized to form a segmented inclined plane without departing from the essence of the present invention. Also, the angle of inclination of the top wall of a given group of segments can be changed as long as the top walls of all the segments have the same angle of inclination, without departing from the essence of the invention.

Thus, it can be seen that the present invention provides a novel and improved segmented inclined plane which is capable of being utilized as a teaching aid by a teacher in instructing her students. Moreover, in accord with the present invention, a segmented inclined plane has been provided which is particularly suited to be used as a teaching aid to assist in teaching children with learning disabilities. The segmented inclined plane is particularly useful as a teaching aid in assisting a teacher to teach children who because of learning disabilities have been unable to learn to read. Furthermore, in accordance with the present invention a segmented inclined plane has been provided which is capable of being used as a teaching aid by teachers in instructing children who have learning disabilities which are evidenced by the fact that the children have left to right sequencing problems. Also, a segmented inclined plane has been provided which has proven capable of providing very effective results when employed by a teacher to teach a child having learning disabilities which include an aversion to graphic representation to overcome left to right sequencing problems. Finally, in accord with the present invention a segmented inclined plane employable as a teaching aid for children with learning disabilities has been provided which is inexpensive to manufacture, is easy to employ, and is characterized by a relatively long operating life.

Having thus described the invention, I claim:

1. A teaching kit particularly suited for use in instructing children having learning disabilities manifested as left to right sequencing problems and an aversion to graphic representation which have inhibited their ability to read, to learn the concepts of directionality comprising:
   a. a multiplicity of disarranged segments having differing heights assemblable solely in an array selected from a first patterned array and a second patterned array, each of said multiplicity of disarranged segments including a bottom wall, a pair of end walls having differing heights, a pair of side walls of substantially equal dimensions and a sloped top wall, each of said pair of side walls of said multiplicity of disarranged segments having the same length and each of said pair of end walls of said multiplicity of disarranged segments having the same width so that all of said multiplicity of disarranged segments have substantially the same length and substantially the same width, one of said pair of end walls of each of said multiplicity of segments having substantially the same height as one of the pair of end walls of one of the other remaining segments of said multiplicity of segments wherein when said multiplicity of segments is selectively assembled in said first patterned array said multiplicity of segments are assembled in abutting relation in order of increasing height with said top walls of said multiplicity of segments providing a continuous plane of increasing inclination and when said multiplicity of segments is selectively assembled in said second patterned array said multiplicity of segments are assembled in abutting relation in order of decreasing height with said top walls of said multiplicity of segments providing a continuous plane of decreasing inclination; and
   b. a reading script comprising textual material consisting of a first story containing instructions for manually selecting from said multiplicity of disarranged segments the one of said multiplicity of disarranged segments having the least height and for manually assembling in abutting relation beginning with said one of said multiplicity of segments of the least height the remainder of said multiplicity of segments in sequential left to right order of increasing height to form a three-dimensional representation of said first story comprising said first patterned array, and a second story containing instructions for manually selecting from said multiplicity of disarranged segments the one of said multiplicity of disarranged segments having the greatest height and for manually assembling in abutting relation beginning with said one of said multiplicity of segments of greatest height the remainder of said multiplicity of segments in sequential left to right order of decreasing height to form a three-dimensional representation of said second story comprising said second patterned array.

2. The teaching kit as set forth in claim 1 wherein said multiplicity of segments comprises ten individual segments.

3. The teaching kit as set forth in claim 1 wherein said multiplicity of segments comprises four individual segments.

4. A method of teaching children having learning disabilities the concept of directionality comprising the steps of:
   a. providing a multiplicity of segments each having differing heights as compared to each other and a sloped top wall and assembable selectively in a continuous inclined plane selected from a first continuous inclined plane having increasing inclination and a second continuous inclined plane having decreasing inclination;
   b. positioning the multiplicity of segments in disarray before the child;
   c. reciting a story to the child containing instructions for assembling the multiplicity of segments in a predetermined sequence beginning with one of the multiplicity of segments identifiable by the height thereof;
   d. selecting from the multiplicity of disarranged segments by the child of the identified one of the multiplicity of segments; and
   e. assembling by the child in abutting relation beginning with the identified one of the multiplicity of segments of all of the multiplicity of segments in sequential left to right order of height to form a three-dimensional representation of the story recited to the child comprising a continuous inclined plane selected from the first continuous inclined plane having increasing inclination and the second continuous inclined plane having decreasing inclination.

* * * * *